United States Patent
Bomba

(10) Patent No.: US 7,104,778 B2
(45) Date of Patent: Sep. 12, 2006

(54) INTERNATIONAL DIE DECKLE WITH FLOW CONTROL

(75) Inventor: Richard D. Bomba, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 354 days.

(21) Appl. No.: 10/801,354

(22) Filed: Mar. 16, 2004

(65) Prior Publication Data

US 2005/0208173 A1    Sep. 22, 2005

(51) Int. Cl.
*B29C 47/16* (2006.01)

(52) U.S. Cl. .................. 425/381; 425/382.4; 425/465; 425/466

(58) Field of Classification Search ................ 425/466, 425/465, 382.4, 381
See application file for complete search history.

(56) References Cited

U.S. PATENT DOCUMENTS

| | | | |
|---|---|---|---|
| 2,982,995 A * | 5/1961 | Groleau | 425/466 |
| 3,694,132 A | 9/1972 | Bunte et al. | |
| 3,706,518 A * | 12/1972 | Bunte et al. | 425/381 |
| 4,197,069 A * | 4/1980 | Cloeren | 425/131.1 |
| 4,283,168 A | 8/1981 | Miller et al. | |
| 4,659,302 A | 4/1987 | Maejima | |
| 5,395,231 A | 3/1995 | Maejima | |
| 5,505,609 A | 4/1996 | Cloeren et al. | |
| 5,575,851 A | 11/1996 | Abe et al. | |
| 5,582,850 A | 12/1996 | Cloeren et al. | |
| 5,830,391 A | 11/1998 | Lamkemeyer et al. | |
| 6,106,268 A | 8/2000 | Figa et al. | |

* cited by examiner

*Primary Examiner*—Joseph S. Del Sole
(74) *Attorney, Agent, or Firm*—Clyde E. Bailey; Paul A. Leipold

(57) ABSTRACT

An apparatus (10) for changing the width of an internal die cavity (12) to accommodate product width changes has a die end plate (14) with a front surface facing the internal die cavity (12), a rear surface and defines an opening that extends through the front and rear surfaces. An internal deckle mounting block (16) attaches to the rear surface of end plate (14). An internal deckle has inner (18) and outer (20) members and mounts on the mounting block (16). Inner member (18) extends through the opening of the die end plate (14) and defines a chamber (22) and a first longitudinal slot (24). The outer member (20) is positioned about the inner member (18) concentric therewith and defines a second longitudinal slot (26). The inner member (18) rotates about the outer member (20) to vary alignment of the slots and create a passageway narrower than either slot to control coating thickness.

14 Claims, 4 Drawing Sheets

INTERNATIONAL DIE DECKLE WITH FLOW CONTROL

FIELD OF THE INVENTION

The invention relates generally to extrusion coating of polymeric resins using a coating die, and more particularly to a device for controlling the flow of resin at the edges of an extrusion coating die.

BACKGROUND OF THE INVENTION

Polymeric resins are extrusion coated through dies to produce a polymeric coating. In producing photographic paper, a polymeric resin, such as polyethylene for example, is extrusion coated through dies onto the photographic paper substrate. The internal cavity of the die is normally of constant cross section across the coating width thereby enabling manufacture of various coating widths using a single die. Typically, coating width changes are made by adjusting external deckles which restrict the flow of resin through the slot opening. A common manufacturing problem resulting from the constant cross section internal and external deckles is non-uniform coating thickness at the edges of the coated material. The non-uniformity of thickness can be caused by a number of factors such as non-uniform cavity pressure, non-uniform molten resin temperature, or non-uniform Theological properties.

Prior efforts at controlling edge contours have focused on internal deckles with external width adjustment capability to improve edge bead thickness and thickness uniformity of the extruded layer near the edge, internal deckles with multiple stepped inserts and improved seals, and internal deckles with flow control obtained by changing the temperature of the insert or by providing separate flow channels to introduce a different resin material into the edge region. Such efforts are disclosed in U.S. Pat. Nos. 6,106,268; 5,830,391; 5,582,850; 5,575,85; 5,505,609; 5,395,231; 4,659,302; 4,283,168; 3,694,132 and 2,982,995. These efforts at controlling the flow of resin near the edge try to mimic a clothes hanger shaped internal die cavity (tapered from center to edge) that is normally limited to constant width applications. The clothes hanger cavities are designed for specific flow conditions and resin rheological properties. In addition to multiple width limitations, resin flow rates and properties limit use of clothes hanger dies.

Constant cross section cavity extrusion dies are commonly constructed with adjustable lip sections to accommodate the cross width pressure distribution and resulting non-uniform resin flow. Mechanical design constraints have limited cross width bolt adjustment intervals to approximately one inch. Structural requirements for the die deformation require substantial adjustable lip cross sections. Both of these items, bolt spacing and stiff sections, limit the usefulness of external die bolts to adequately provide the fine cross width resolution needed to control coating thickness at the edges.

It is desirable to have an internal deckle closely fitted in the die cavity with an externally adjustable cross width. It is also desirable to control the flow of resin in a localized region near each edge of the die and to change resin flow and coating width independently of each other. While obtaining finer flow control, it is also desirable to reduce resin stagnation and the resultant resin physical property degradation.

SUMMARY OF THE INVENTION

The present invention is directed to overcoming one or more of the problems set forth above. Briefly summarized, according to one aspect of the invention, an apparatus for changing the width of an internal die cavity to accommodate product width changes comprises a die end plate having a front surface facing the internal die cavity, a rear surface and defining an opening extending through the front and rear surfaces. An internal deckle mounting block is attached to the rear surface of the die end plate. An internal deckle has a longitudinal axis, an inner deckle member and an outer deckle member and is mounted on the mounting block. The inner deckle member extends through the opening of the die plate and defines a chamber and a first longitudinal slot. The outer deckle member is positioned about the inner deckle member concentric therewith and defines a second longitudinal slot. The inner deckle member is rotatable relative to the outer deckle member to vary alignment of the slots and create a passageway narrower than either of the slots.

The chamber is tapered axially to improve resin flow velocity and residence time. The slots adjust to control resin flow at an edge of the product. Together, the chamber and slots control resin flow to produce a uniform edge on the product. Interaction of the chamber and slots enable finer adjustment resolution than with die lip bolt adjustments. The slots are adjustable independently of product width changes.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
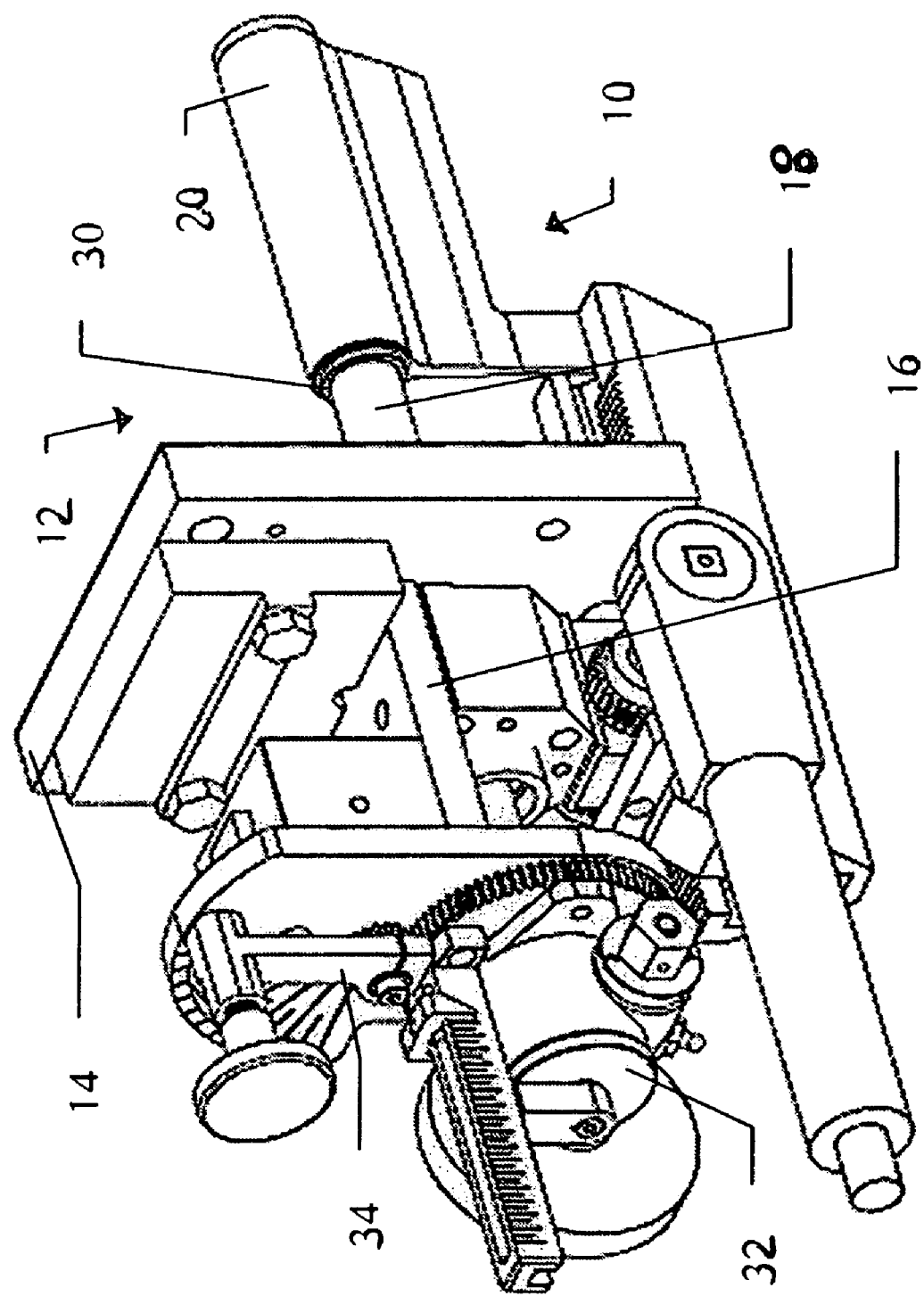
FIG. 1 is a perspective view of a preferred embodiment of a deckle assembly according to the present invention.
Figure 2:
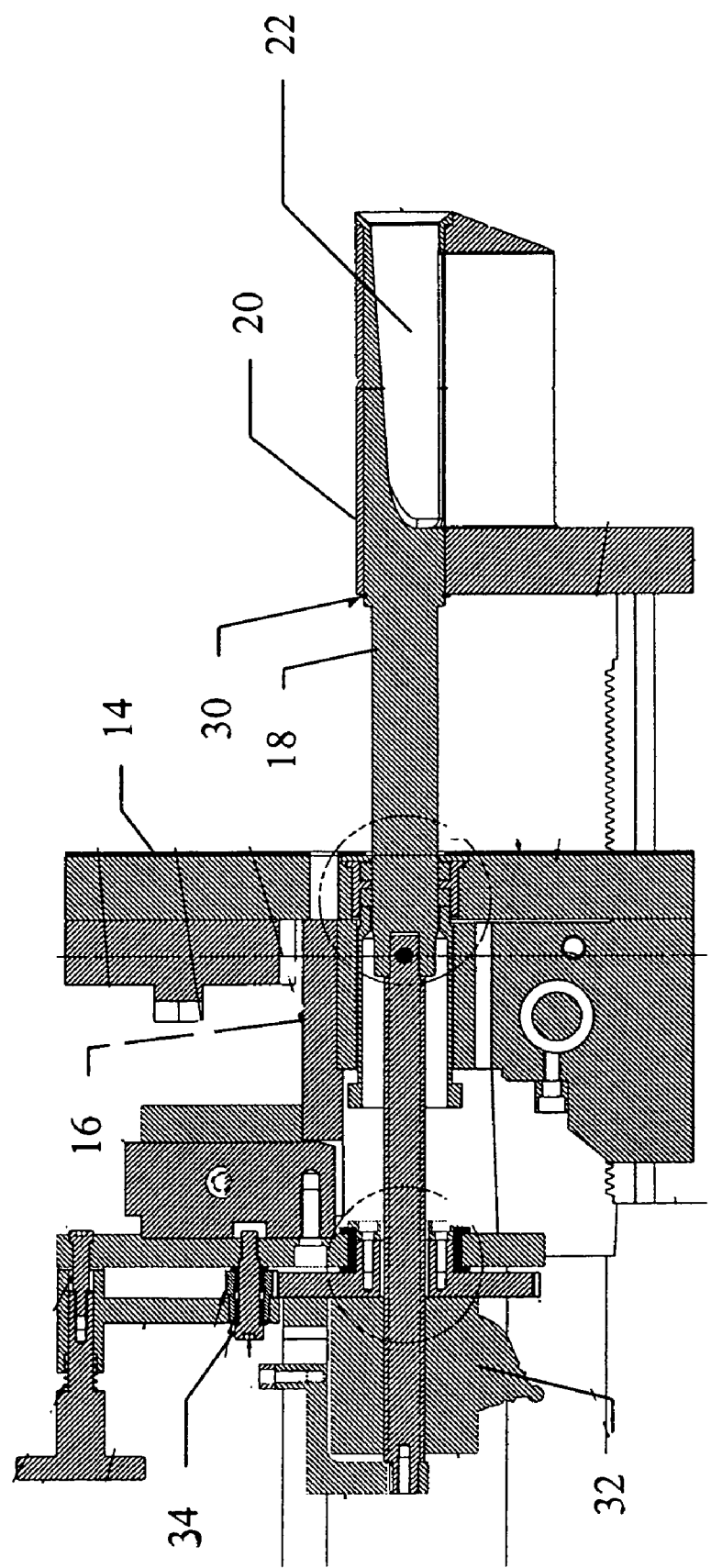
FIG. 2 is a vertical longitudinal cross section of the deckle assembly of FIG. 1.
Figure 3:
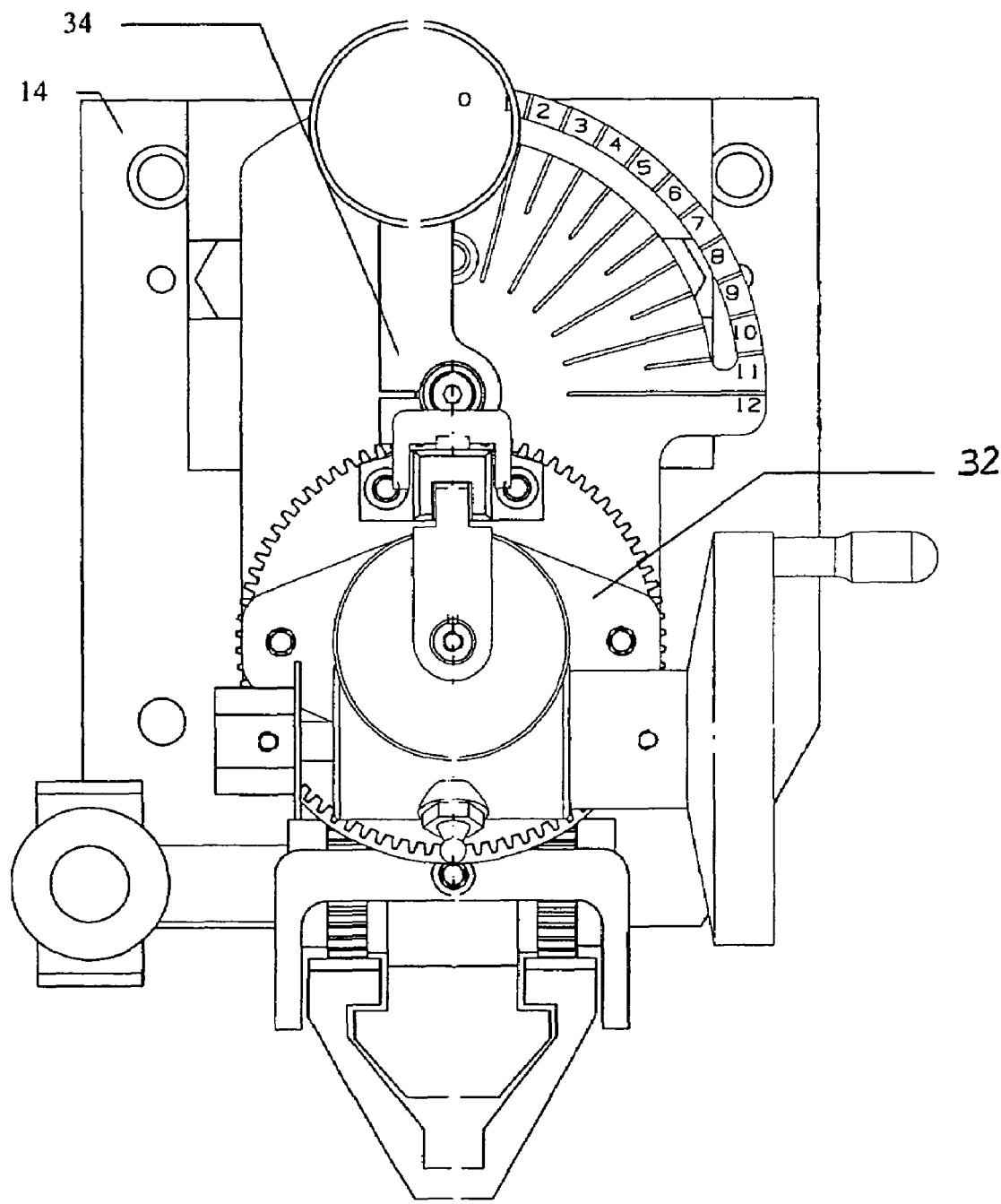
FIG. 3 is a left end view of the deckle assembly of FIG. 1.
Figure 4:
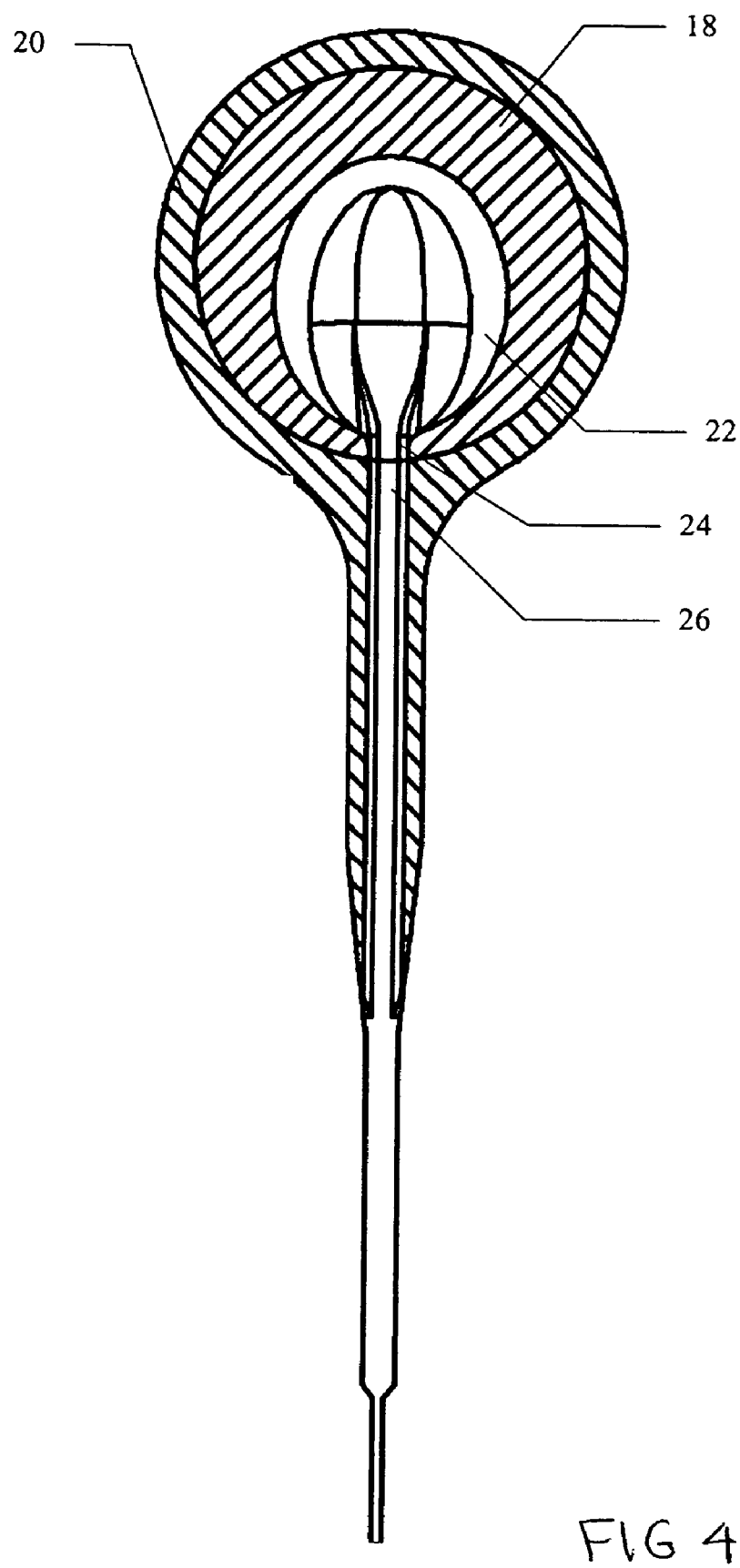
FIG. 4 is a somewhat enlarged diagrammatic right end view of the internal deckle of FIG. 1.

Referring to FIGS. 1–4, an apparatus 10 is illustrated for changing the width of an internal die cavity 12 to accommodate product width changes. The apparatus 10 illustrated effects only one edge of the product, it is to be understood that a second apparatus is required too at the other side edge of the product or material. The apparatus 10 includes a die end plate 14 having a front surface facing the internal die cavity 12, an opposed rear surface and defines an opening extending through the front and rear surfaces. An internal deckle mounting block 16 is attached to the rear surface of die end plate 14.

An internal deckle has a longitudinal axis, an inner deckle member 18 and an outer deckle member 20 and is mounted on mounting block 16. Inner deckle member 18 extends through the central opening of die plate 14 and defines a chamber 22 and a first longitudinal slot 24. Inner deckle member 18 has a first end portion engaging the mounting block 16 and is supported thereby, and has a second end portion containing chamber 22 and extending into the internal die cavity 12. Chamber 22 is a longitudinal chamber having first and second end portions with the first end portion having smaller dimensions and smaller volume than the second end portion and is positioned closer to the front surface of end plate 14 than the second end portion. The second end portion of the inner deckle member has a circumferential flange 28 and defines a circumferential groove. A retaining clip 30 is seated in the groove.

Outer deckle member 20 is positioned about inner deckle member 18 concentric therewith and defines a second longitudinal slot 26. Outer deckle member 20 is seated on inner deckle member 18 between the flange 28 and groove. Inner deckle member 18 is rotatable relative to outer deckle member to vary alignment of the slots 24, 26 and create a passageway narrower than either of the slots. This narrower slot controls the thickness of the coating. The shape of chamber 22 and interaction of slots 24, 26 enable finer adjustment resolution than die lip bolt adjustments.

A worm gear assembly 32 provides a means for moving inner deckle member axially 18 to accommodate product width changes, and gear assembly 34 provides a means for moving inner deckle member 18 radially to vary the passageway and thereby coating thickness. Chamber 22 and slots 24, 26 control resin flow at an edge of the web independent of changes in the width of the web.

It can now be appreciated that a device for controlling the flow of resin at the edges of an extrusion coating die and for changing the width of an internal die cavity to accommodate product width changes has been presented. A constant cross section cavity extrusion dye with adjustable lips is fitted with an internal deckle assembly at each end of the die body. The internal deckle is closely fitted (approximately 0.005 inch clearance) to the cross section of the die cavity extending completely into the final die lip land area. The circular feature has been provided to accept the internal flow control insert which is the inner deckle member. An opening is created spanning from the die pre-land area to the surface of the circular feature. This opening provides the main conduit for resin flow to the die lip region. The edge of the internal deckle closest to the flow source has been tapered to facilitate resin flow and enable merging of the melt streams from the deckle area and the open cavity area. The extension of the internal deckle into the die lip land coupled with tightening of a nearby die lip adjustment bolt area enables a more positive sealing surface at the edge of the melt curtain. Sealing of the internal deckle to the cavity is primarily accomplished through the close tolerance fits. In addition, a secondary seal in the form of a braided packing arrangement has been added at the extreme edge of the internal deckle. The fit of the internal flow control element to the internal deckle is carefully controlled to prevent resin flow past the deckle insert. A spiral retaining clip mounted on the internal flow control element fixes the internal deckle axially but still allows rotation. The internal deckle is fabricated from precipitation hardenable stainless steel which provides desirable mechanical properties. Electrical discharge machining techniques are used in the fabrication of the internal deckle.

The internal flow control element consists of a circular cross section metal insert in which a tapered flow cavity has been created. Within the tapered cavity, a longitudinal slot has been created that coincides with the opening of the internal deckle. The interface of these two openings create a region of variable geometry (and the resultant flow control) when the internal flow control element is rotated with respect to the internal deckle. The shape of the slot can be a simple rectangle or can incorporate a more complex shape, for example, parabolic or sinusoidal. The tapered inlet provides a stagnation free transition from the circular cross section of the die cavity to the flow control element. The internal flow surface of the chamber is tapered axially to improve resin flow velocity and residence time. The flow control element, in addition to rotating, moves axially to accommodate width changes. The flow control insert can be readily modified and exchanged as process conditions warrant. Axial movement is provided by a commercially available worm gear actuator. The internal flow control element is fabricated from precipitation hardenable stainless steel which provides desirable mechanical properties. Electrical discharge machining techniques are used in the fabrication of the internal flow control element.

The external deckles are used to provide coarse and rapid melt curtain width changes at start up and shutdown.

While the invention has been described with reference to a preferred embodiment, it will be appreciated that other variations and modifications can be effected by a person of ordinary skill in the art without departing from the scope of the invention. For example, while circular cross section flow control elements have been described, the flow control elements can have other cross sections and can be incorporated into die cavities of non-circular cross section.

PARTS LIST 10 apparatus
12 internal die cavity
14 die end plate
16 internal deckle mounting block
18 inner deckle member
20 outer deckle member
22 chamber
24 first longitudinal slot
26 second longitudinal slot
28 circumferential flange
30 retaining clip
32 worm gear assembly
34 gear assembly

What is claimed is:

1. An apparatus for an internal die cavity, comprising:
a die end plate having a front surface facing the internal die cavity, a rear surface and defining an opening extending through said front and rear surfaces;
an internal deckle mounting block attached to said rear surface of said die end plate; and
an internal deckle having a longitudinal axis, an inner deckle member and an outer deckle member and being mounted on said mounting block, said inner deckle member extending through said opening of said die end plate and defining a chamber and a first longitudinal slot, said outer deckle member being positioned about said inner deckle member concentric therewith and defining a second longitudinal slot, said inner deckle member being rotatable relative to said outer deckle member to vary alignment of said slots and create a passageway narrower than either of said slots.

2. An apparatus, as set forth in claim 1, wherein said inner deckle member has a first end portion engaging said mounting block and being supported thereby and has a second end portion containing said chamber and extending into said internal die cavity.

3. An apparatus, as set forth in claim 2, wherein said chamber is a longitudinal chamber having first and second end portions with said first end portion having smaller dimensions than said second end portion and positioned closer to said front surface than said second end portion.

4. An apparatus, as set forth in claim 2, wherein said chamber is a longitudinal chamber having first and second end portions with said first end portion having a smaller volume than said second end portion and positioned closer to said front surface than said second end portion.

5. An apparatus, as set forth in claim 1 including means for moving said inner deckle member axially to accommodate product width changes.

6. An apparatus, as set forth in claim 1 including means for moving said inner deckle member radially to vary said passageway.

7. An apparatus, as set forth in claim 2, wherein said second end portion of said inner deckle member has a circumferential flange and defines a circumferential groove, said outer deckle member being seated on said inner deckle member between said flange and groove.

8. An apparatus, as set forth in claim 7 including a retaining clip seated in said groove.

9. An apparatus for an internal die cavity, said internal die cavity shaping resinous material into a web having edges, said apparatus comprising:
    a die end plate having a front surface facing the internal die cavity, a rear surface and defining an opening extending through said front and rear surfaces;
    an internal deckle mounting block attached to said rear surface of said die end plate; and
    an internal deckle for controlling resin flow at an edge of the web, said internal deckle having a longitudinal axis, an inner deckle member, an outer deckle member and being mounted on said mounting block, said inner deckle member extending through said opening of said die end plate to a location near the path of an edge of the web, said inner deckle member defining a chamber and a first longitudinal slot parallel to said longitudinal axis, said outer deckle member being positioned about said inner deckle member concentric therewith and defining a second longitudinal slot parallel to said longitudinal axis, said inner deckle member being rotatable relative to said outer deckle member to vary alignment of said slots and create a passageway narrower than either of said slots.

10. An apparatus, as set forth in claim 9, wherein said inner deckle member has a first end portion engaging said mounting block and being supported thereby and has a second end portion containing said chamber and extending into said internal die cavity.

11. An apparatus, as set forth in claim 10, wherein said chamber is a longitudinal chamber having first and second end portions with said first end portion having smaller dimensions than said second end portion and positioned closer to said front surface than said second end portion.

12. An apparatus, as set forth in claim 10, wherein said chamber is a longitudinal chamber having first and second end portions with said first end portion having a smaller volume than said second end portion and positioned closer to said front surface than said second end portion.

13. An apparatus, as set forth in claim 9 including means for moving said inner deckle member axially to accommodate web width changes.

14. An apparatus, as set forth in claim 9 including means for moving said inner deckle member radially to vary said passageway to thereby adjust resin flow at an edge of the web.

* * * * *